United States Patent
Corghi (10) Patent No.: US 6,619,362 B2
(45) Date of Patent: Sep. 16, 2003

(54) AUTOMATIC TYRE REMOVAL AND MOUNTING DEVICE AND TYRE REMOVAL MACHINES EQUIPPED THEREWITH

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 09/917,888

(22) Filed: Jul. 31, 2001

(65) Prior Publication Data

US 2002/0017368 A1 Feb. 14, 2002

(30) Foreign Application Priority Data

Aug. 3, 2000 (IT) ...................... RE00A000078

(51) Int. Cl.[7] .......................................... B60C 25/135
(52) U.S. Cl. ...................... 157/1.24; 157/1.26
(58) Field of Search .................. 157/1.17, 1.24, 157/1.26

(56) References Cited

U.S. PATENT DOCUMENTS

| 2,850,061 A | | 9/1958 | Twiford | |
|---|---|---|---|---|
| 3,791,434 A | * | 2/1974 | Dequesne | 157/1.24 |
| 4,615,370 A | * | 10/1986 | Cuccolini | 157/1.24 |
| 5,226,465 A | * | 7/1993 | Schon et al. | 157/1.24 |
| 6,408,921 B1 | * | 6/2002 | Bonacini | 157/1.24 |
| 2001/0042601 A1 | * | 11/2001 | Corghi | 157/1.26 |

FOREIGN PATENT DOCUMENTS

| DE | 2 416 668 | 11/1974 |
|---|---|---|
| IT | RE2000A000051 | 5/2000 |

* cited by examiner

Primary Examiner—James G. Smith
(74) Attorney, Agent, or Firm—Browdy and Neimark, P.L.L.C.

(57) ABSTRACT

An automatic device for mounting and removing a tire (6) onto and from the relative wheel rim (5), comprising, for supporting the wheel rim (5) complete with tire (6), rotary means associated with a frame (7) which supports an operating head (16), positionable in level and horizontally translatable, provided with at least one demounting tool (25) which can rotate about an axis perpendicular to the main axis of said operating head (16) to be positioned between a first position for seeking and gripping the bead of the tire (6), in which the tool (25) is orientated towards the center of the wheel rim, and a second position for extracting said bead of the tire (6) from the wheel rim, in which the tool (25) is perpendicular to the axis or is orientated in the opposite direction.

10 Claims, 8 Drawing Sheets

AUTOMATIC TYRE REMOVAL AND MOUNTING DEVICE AND TYRE REMOVAL MACHINES EQUIPPED THEREWITH

BACKGROUND OF THE INVENTION

1. Technical Field of the Invention

This invention concerns in general those means, installed on tyre removal machines, which enable the tyre to be removed from and/or mounted on the wheel rim. The wheel rim comprises two lateral bead retaining flanges onto which the beads of the tire rest.

2. Prior Art

To mount tyres on their wheel rims, and to effect the opposite operation, machines are known comprising essentially a rotary platform of vertical axis provided with a self-centering device for locking the wheel rim, which is overlaid by a support which supports, adjustable in height and in the horizontal direction, a tool arranged to interact with the tyre edge or bead, to urge it below, or extract it from, the flange of the wheel rim.

In known machines said tool is positioned at the end of a vertical support bar which slides within the end seat of a horizontal arm, to which it can be locked in level.

The horizontal arm itself slides in the end seat of a vertical plate which extends upwards from the machine base to the side of the platform which receives the tyre.

Said horizontal arm is provided with means for locking it in the desired position.

The known art teaches that to be able to remove a tyre from the wheel rim the first operation which the operator has to carry out is to detach the tyre bead from the bead retaining flange of the wheel rim using the bead release device with which tyre removal machines are usually provided. The operator, after the tyre bead has been detached from the bead retaining flange, places the wheel, comprising the wheel rim and tyre, on the self-centering device and locks it in the working position.

At this point the operator positions the tool in contact with the flange of the wheel rim and, using a suitable lever, lifts the tyre bead above the working surface of the tool and then rotates the wheel rim while simultaneously pressing with one hand on that side of the tyre opposite that at which the tool is positioned, in order to enable the bead to position itself in the well of the wheel rim. In addition, while the wheel rim is rotating, the operator has to aid the escape of the bead using a lever, one end of which is inserted between the tyre edge and the flange of the wheel rim.

In contrast, to mount the tyre on the wheel rim, the operator firstly locks the wheel rim on the self-centering device, then positions the tyre on the wheel rim and then by pressing on its upper side has to at least partially insert the lower bead of the tyre into the wheel rim. At this point, the operator locates the tool in its working position, and in particular has to position a part of the tyre bead below the working surface of the tool. He then rotates the self-centering device and with his hands, by pressing on the side of the tyre, aids the insertion of the bead into the bead retaining flange of the wheel rim.

It should be noted that both during the mounting of the tyre onto the wheel rim and during its removal, the operator usually lubricates the edge of the tyre bead to facilitate its mounting onto or its removal from the wheel rim.

Although devices of known type perform their proposed functions they always require the intervention of the operator, and require from him a physical force the extent of which depends on the size of the tyre and the rigidity of its bead.

In addition, the manual intervention of the operator means that he is subjected to the risk of accidents, as he has to work with moving equipment and in contact with lubricated surfaces.

OBJECT AND SUMMARY OF THE INVENTION

An object of the present invention is to overcome the drawbacks of the known art within the framework of a rational and reliable solution, which does not require the operator to intervene actively during the removal of the tyre from the wheel rim, or during the opposite operation.

A further object of the invention is to provide a device which accelerates the tyre mounting and removal operations.

The invention attains said objects by virtue of an automatic device for mounting and removing the tyre on/from the wheel rim which, associated with rotary means for supporting the wheel rim, is able to extract and/or insert the tyre from/into the wheel rim without requiring any operator intervention.

According to the invention the device comprises an operating head provided with a demounting tool. The demounting tool is hinged to the operating head, and is arranged to grip the tyre and then extract it from the wheel rim.

In greater detail, said demounting tool can pivot about the hinging axis to position itself between at least one first position in which the tyre bead is gripped and at least one second position in which the tyre bead is extracted from the wheel rim.

The operating head can rotate about its axis, and is associated with means which enable it to translate horizontally and vertically in such a manner as to position the demounting and mounting tools in proximity to the flange of the wheel rim.

The wheel rim support means must preferably be such as to leave both flanges of the wheel rim free, so that the device of the invention can act simultaneously on both sides of the wheel rim.

The wheel rim support means can translate horizontally to approach and withdraw from the mounting-demounting tool of the invention in accordance with the wheel rim diameter and possibly the operating position assumed by the mounting and demounting tools.

Finally, the combination of the device of the invention with said rotary support means for the wheel rim results in an assembly representing a complete tyre removal machine which can also be easily provided with a bead release tool of known type.

The particular characteristics of the invention are defined in the claims.

The constructional and operational characteristics will be more apparent from the ensuing description of a preferred embodiment thereof given by way of non-limiting example and illustrated in the accompanying drawings.

DETAILED DESCRIPTION OF THE PREFERRED EMBODIMENT(S) OF THE INVENTION

Said figures show the tyre removal machine 1, which comprises a lower base 2, from the upper surface of which there projects a rotary shaft 3 for supporting the support and a locking means 4 for the wheel rim 5 on which the tyre 6 is installed.

The shaft 3, and hence also the support and locking means 4 for the wheel rim 5, can translate radially, operated by means, known per se and not shown, positioned inside the casing 2.

It should be noted that said means 4 are not described in detail as they form the subject of the U.S. Pat. No. 6,516,855 in the name of the same Applicant.

To the rear of the casing 2 there is present a vertical frame 7 provided with guides 70 for the sliding of an automatic device 9 for mounting and removing the tyre 6 on/from the wheel rim 5.

In greater detail, the device 9 comprises a carriage 8 provided with four wheels 81 arranged to run on guides 70 of the vertical frame 71; the carriage 8 supports the means, described hereinafter, for mounting and removing the tyre 6 onto/from the wheel rim 5.

Figure 1:
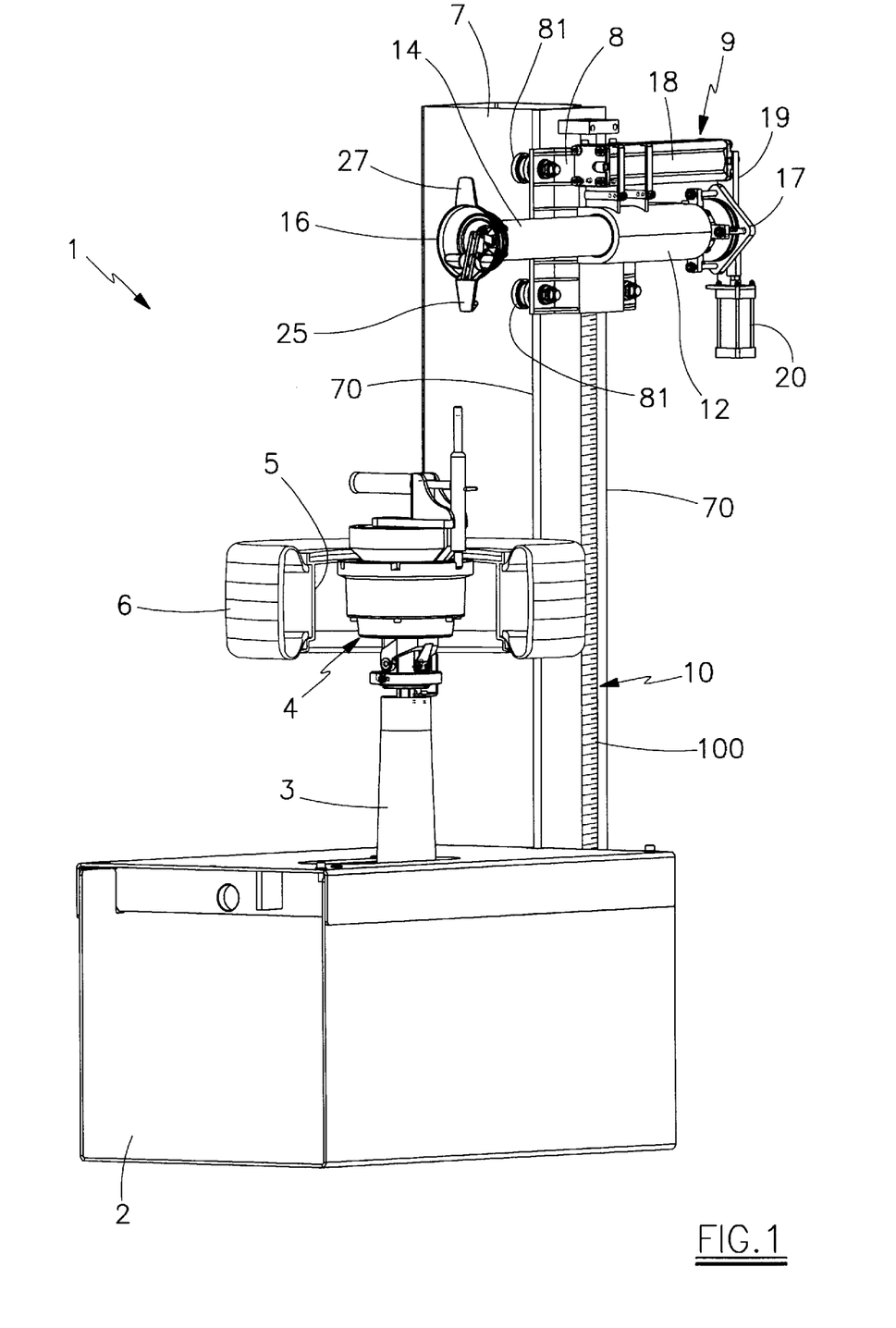
FIG. 1 is a perspective view of the tyre removal machine on which the invention is installed.
Figure 2:
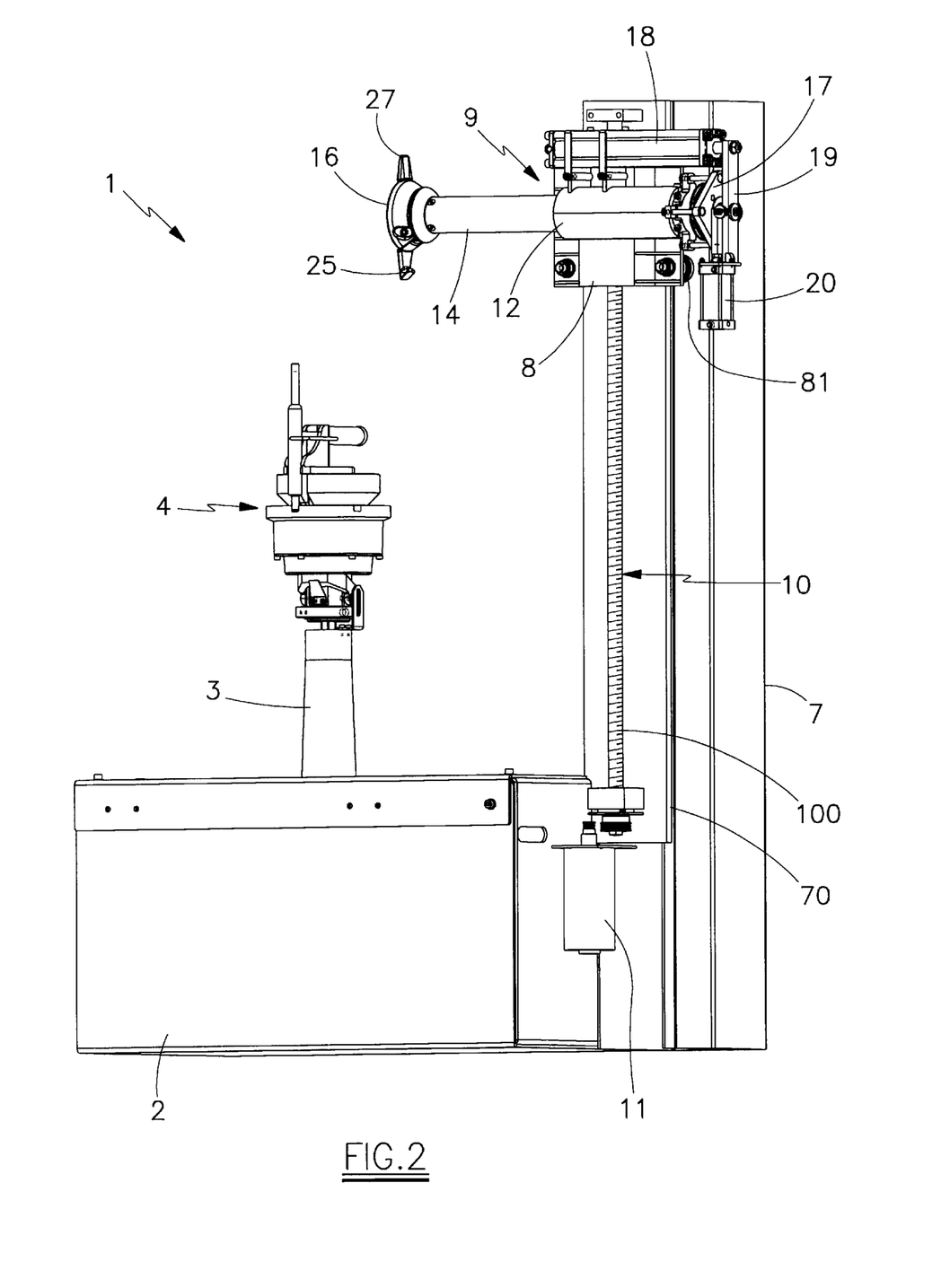
FIG. 2 is a second perspective view of the tyre removal machine on which the invention is installed.

The carriage 8 is driven vertically by a male-female screw mechanism 10, of which the female screw, not shown, is rigid with the carriage 8. The male screw 100 of the screw mechanism 10, shown in FIGS. 1 and 2, is engaged to the carriage 8 and is rotated by the electric motor 11. Rotation of the screw 100 hence causes the carriage 8 to translate vertically.

Figure 3:
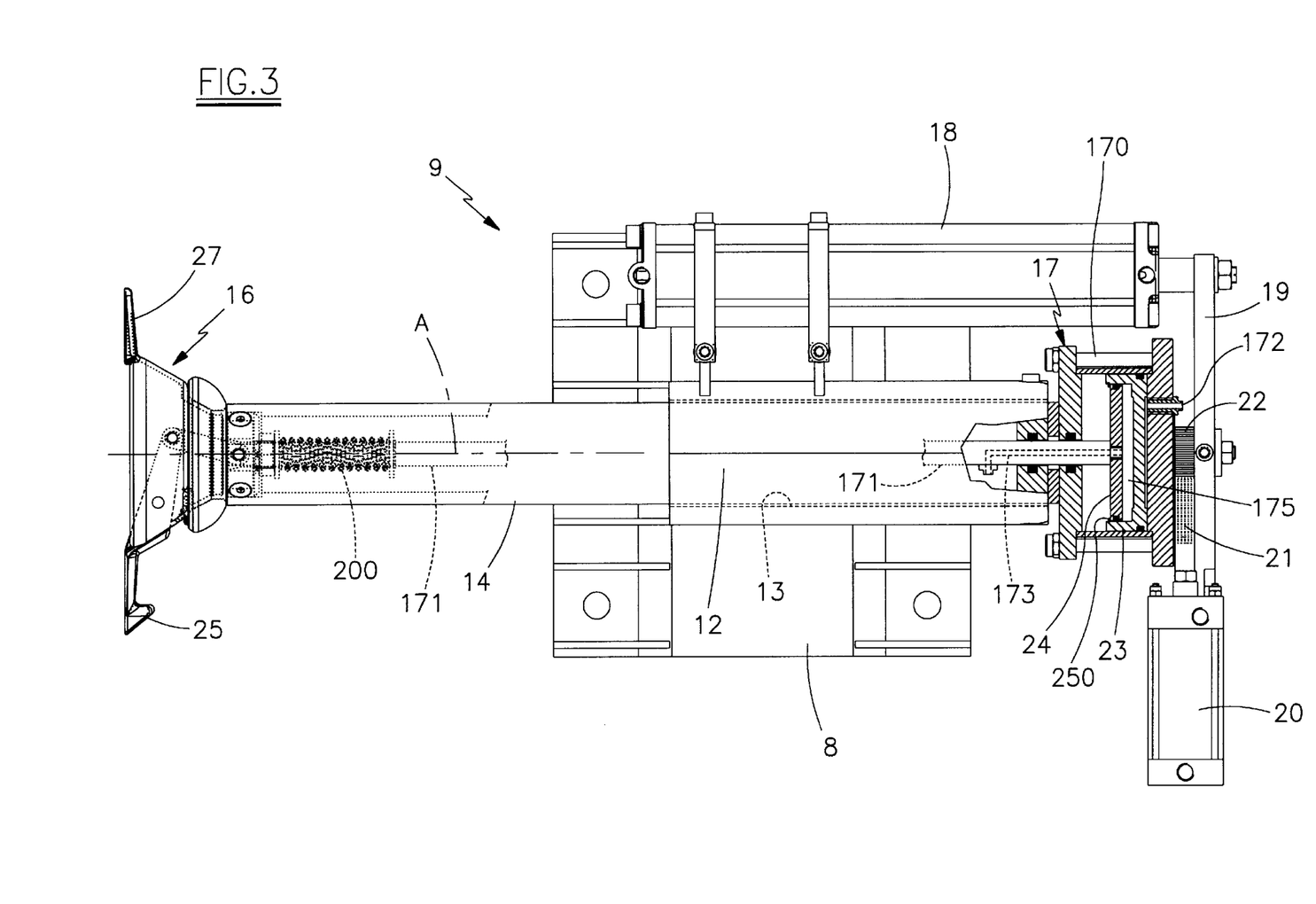
FIG. 3 is a partly sectional view of the device of the invention in a first operating position.

On the carriage 8 there is fixed a member 12, provided with a through hole 13 in which a hollow shaft 14 is inserted and slides, and of which one of its ends carries the operating head 16 and its opposite end is fixed to the cylinder 170 of a cylinder-piston unit 17 (FIG. 3).

The purpose of the cylinder-piston unit 17 is to position in at least two working positions a movable tyre-demounting tool 25 hinged to the operating head 16 and having its hook-shaped lower end projecting from the head.

The hollow shaft 14 is made to translate axially by a pneumatic cylinder-piston unit 18 also rigid with the carriage 8, with its rod carrying at one end a plate 19 secured to the cylinder 170 of the cylinder-piston unit 17. Although secured to the plate 19, the cylinder-piston unit 17 is free to rotate about its own axis.

Said plate 19 carries at its lower end a second pneumatic cylinder-piston unit 20, the rod of which is connected to a rack 21 in which there engages a pinion 22 rigid with the cylinder 170. Operation of the cylinder-piston unit 20 causes the rack 21 to move, resulting in rotation of the cylinder-piston unit 17 and the hollow shaft 14.

Figure 4:
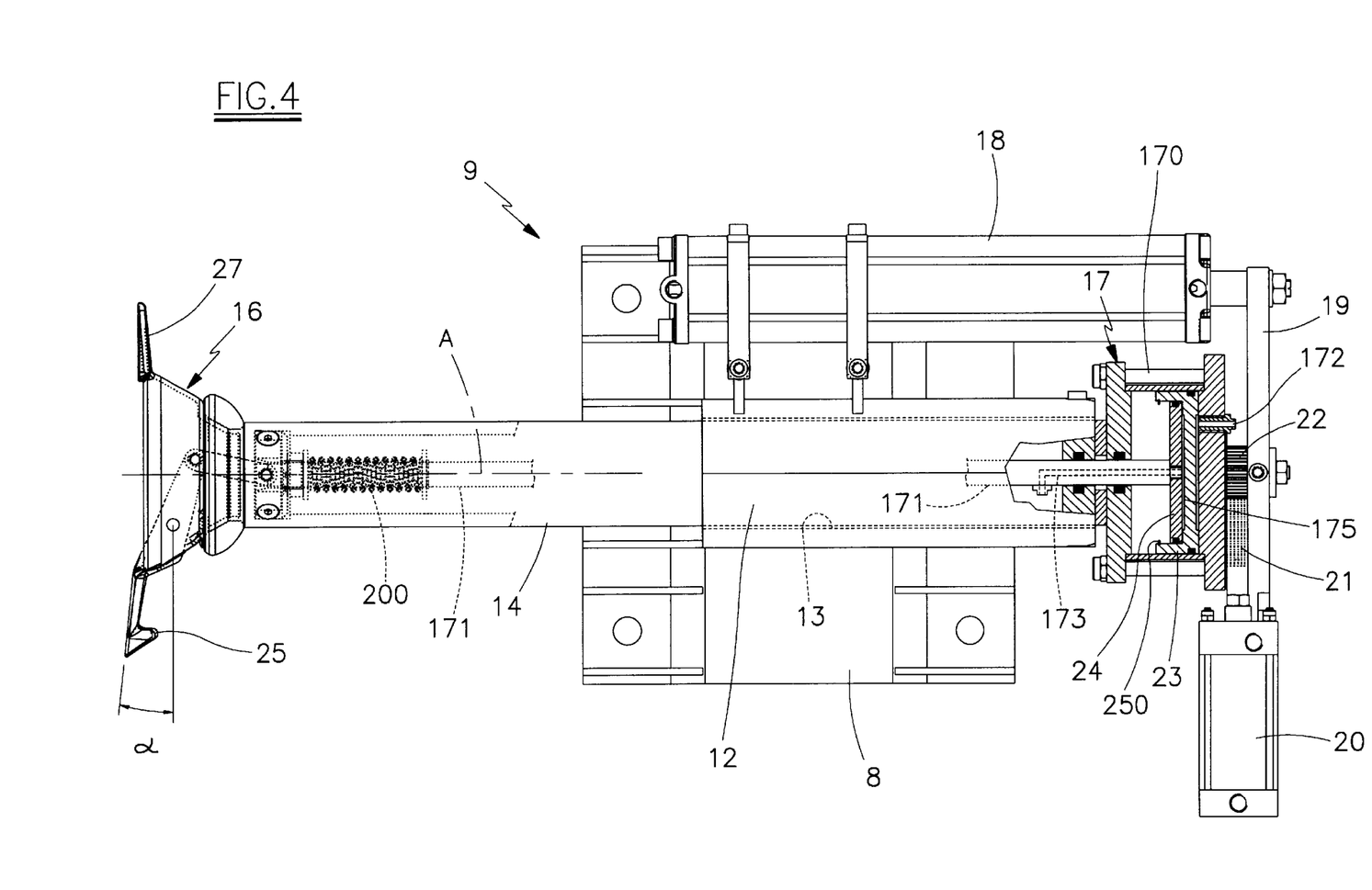
FIG. 4 is a partly sectional view of the device of the invention in a second operating position.
Figure 5:
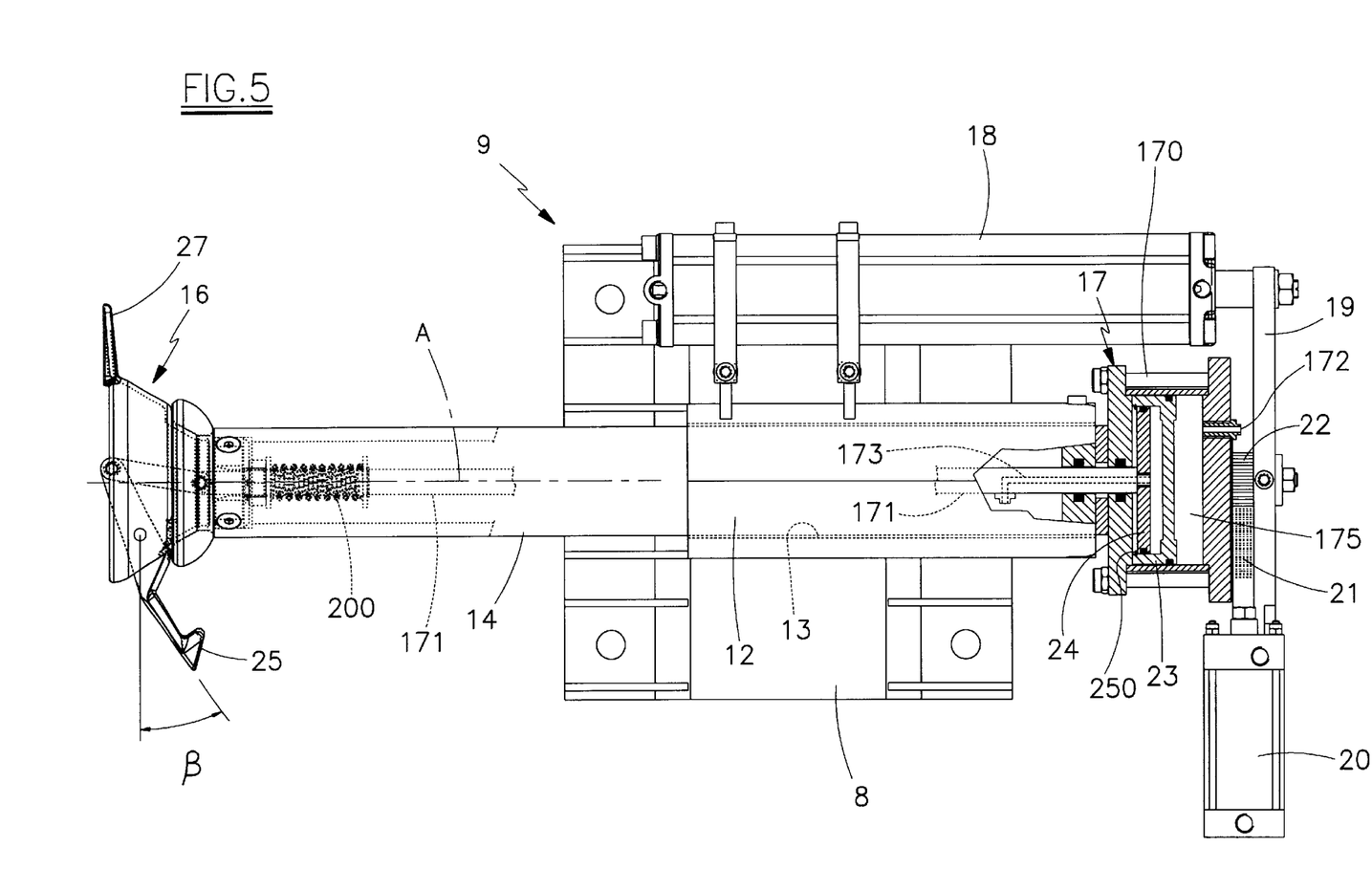
FIG. 5 is a partly sectional view of the device of the invention in a third operating position.

With reference to FIGS. 3, 4 and 5 the pneumatic cylinder-piston unit 17 is provided with a double piston consisting of a cup-shaped piece 23 which slides within the cylinder 170, and a disc 24 with which one end of the rod 171 is rigid, and which slides within said cup-shaped piece 23.

In greater detail, the disc 24 is prevented from withdrawing from the cup-shaped piece 23 by a retention ring 250. The air is fed, by suitable pneumatic means, not shown, into the cylinder 170 via the conduit 172, and, via the conduit 173, into the chamber 175 bounded by the inner walls of the cup-shaped piece and by the disc 24.

Figure 12:
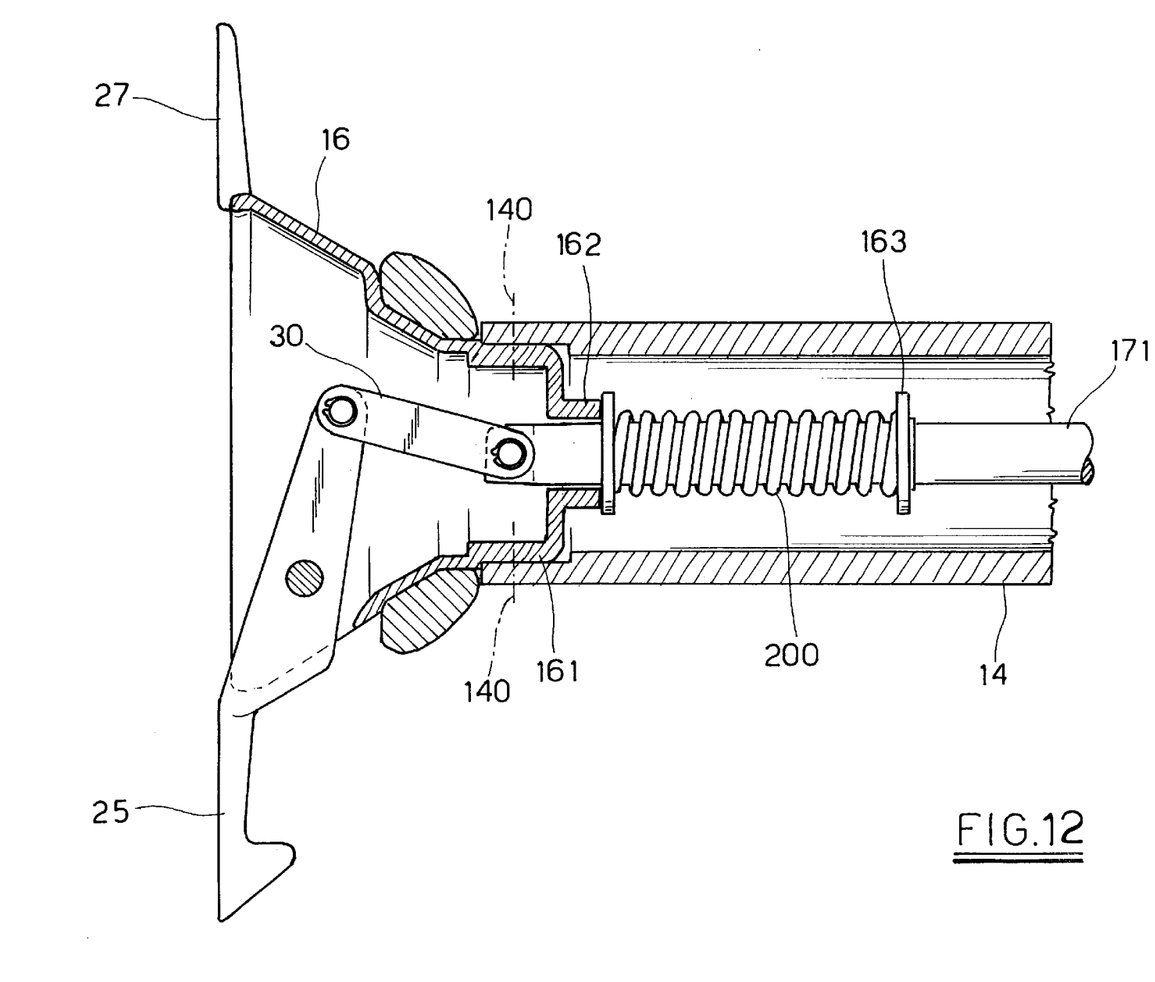
FIG. 12 is a partly sectional view of the operating head with which the invention is provided.

With reference to FIG. 12, the operating head 16 is of substantially frusto-conical form, and is internally hollow. It also presents an annular reduced-diameter portion 161 which is received in the end of the hollow shaft 14, and locked in position thereat by screws 140.

Said annular reduced-diameter portion 161 is provided with a central stem 162 having a through central hole which also passes through said annular reduced-diameter portion 161, and is traversed by the free end of the rod 171.

On the rod 171 there is mounted a compression spring 200, of which one end rests on said central stem 162 and its opposite end rests on a ring 163 locked onto the rod 171.

The free end of the rod 171 is connected, via a connecting bar 30, to the upper end of the tyre demounting tool 25. Specifically, the cylinder-piston unit 17 can dispose the tool 25 in different operating positions, namely a first position for seeking and gripping the tyre bead, and at least two positions for extracting the bead from the bead retaining flange of the wheel rim.

With reference to FIG. 4, when in the first position for seeking and gripping the tyre bead, the tool 15 is inclined at an angle á, of preferably between 2° and 15°, to the vertical axis passing through the centre of rotation of the tool.

FIG. 3 shows the first of the positions in which the tool 25 can extract the bead from the bead retaining flange of the wheel rim. This position also coincides with the tool rest position. When in said position the tool 25 is vertical, by virtue of the fact that compressed air is present in the chamber 175 to maintain the disc 24 against the retention ring 250, against the action of the spring 200. To move the tool from this rest position (FIG. 3) to the position for seeking and gripping the edge of the bead (FIG. 4), the air present in the chamber 175 is extracted. In this manner the spring 200 thrusts the disc 24 against the end of the cup-shaped piece 23, as shown in FIG. 4.

FIG. 5 shows the second position for extracting the tyre bead from the bead retaining flange of the wheel rim. To move the tool into this position from its rest position, shown in FIG. 3, air is fed into the cylinder-piston unit 17 through the conduit 172. In this manner the cup-shaped piece 232 advances against the action of the spring 200 and rotates the tool 25 through an angle á, preferably between 1° and 40°.

When the tool is in this second position, to prevent excessive deformation of the tyre and to facilitate complete extraction of the tyre bead, the shaft 3 is advanced in the tool direction by an amount equal to the chord subtended by the angle á at the hook-shaped end of the bead gripping tool 25.

The operating head 16 is also provided with a fixed tool 27, used during the mounting of the tyre onto the wheel rim.

The operation of the device can either be controlled by the operator using suitable control means, not shown, positioned on the casing 2 of the tyre removal machine, or be controlled automatically by a processor.

The operation of the invention for mounting the tyre on the wheel rim will now be described.

Figure 6:
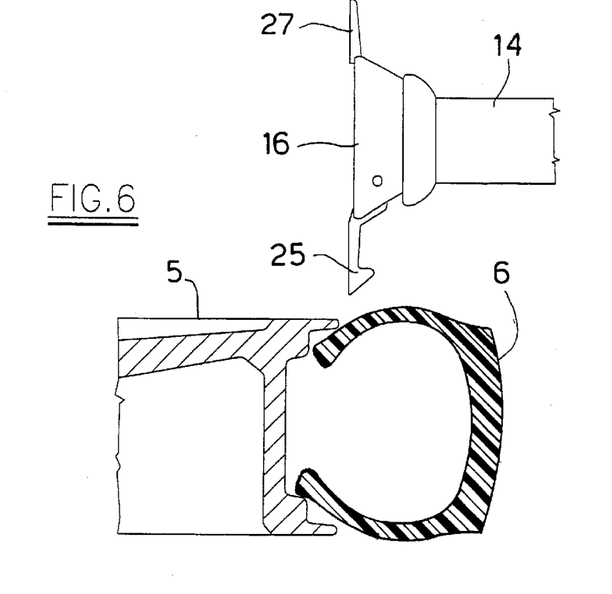
FIGS. 6, 7, 8, 9, 10 and 11 are schematic views of the invention during the removal of the tyre from the wheel rim.

After releasing the bead of the tyre, the operator places the wheel on its support and locking means 4. When the wheel has been locked in position, the operator adjusts the position of the shaft 3 relative to the frame 7 on the basis of the wheel diameter. At this point he operates the device 9, which moves into the position shown in FIG. 6, i.e. it positions the demounting tool 25 into proximity with the flange of the wheel rim, and specifically at 2 millimeters from said flange.

Figures 7, 8:
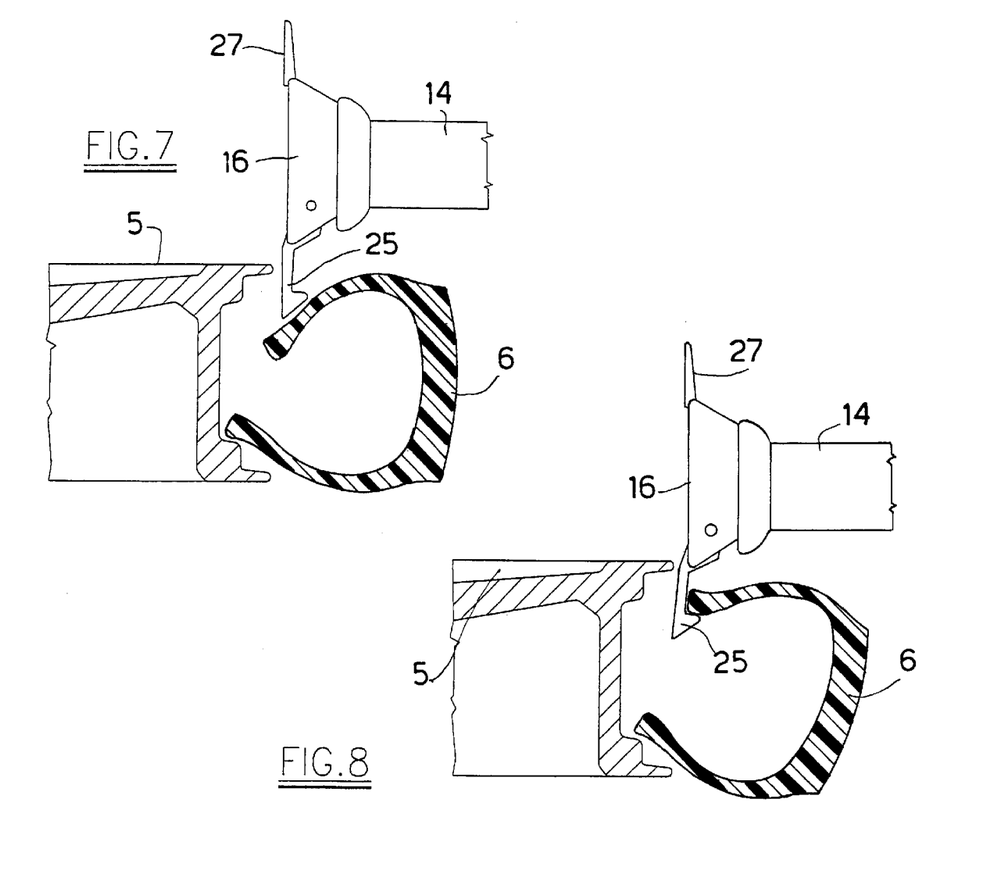

When in this position the device 9 is lowered through a predetermined amount, as shown in FIG. 7, to insert its hook-shaped lower end between the bead retaining flange of the wheel rim and the tyre bead.

Once in position, the tool is moved into the bead seeking and gripping position (FIG. 8), i.e. it is rotated through an angle á to the vertical axis in the direction of the wheel rim, so that the hook-shaped end of the tool 25 grips the edge of the tyre bead.

Figure 9:
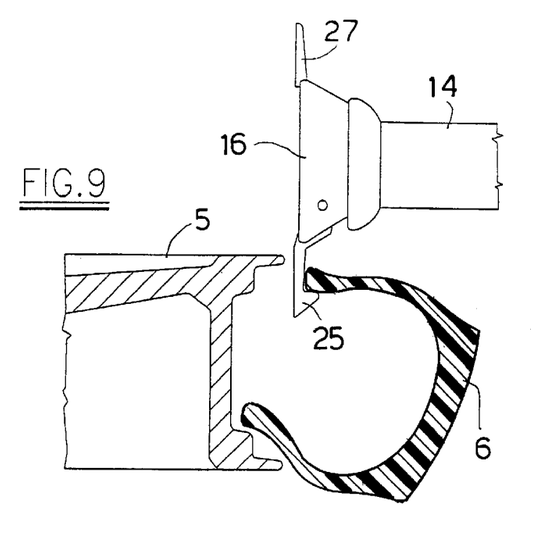
Figures 10, 11:
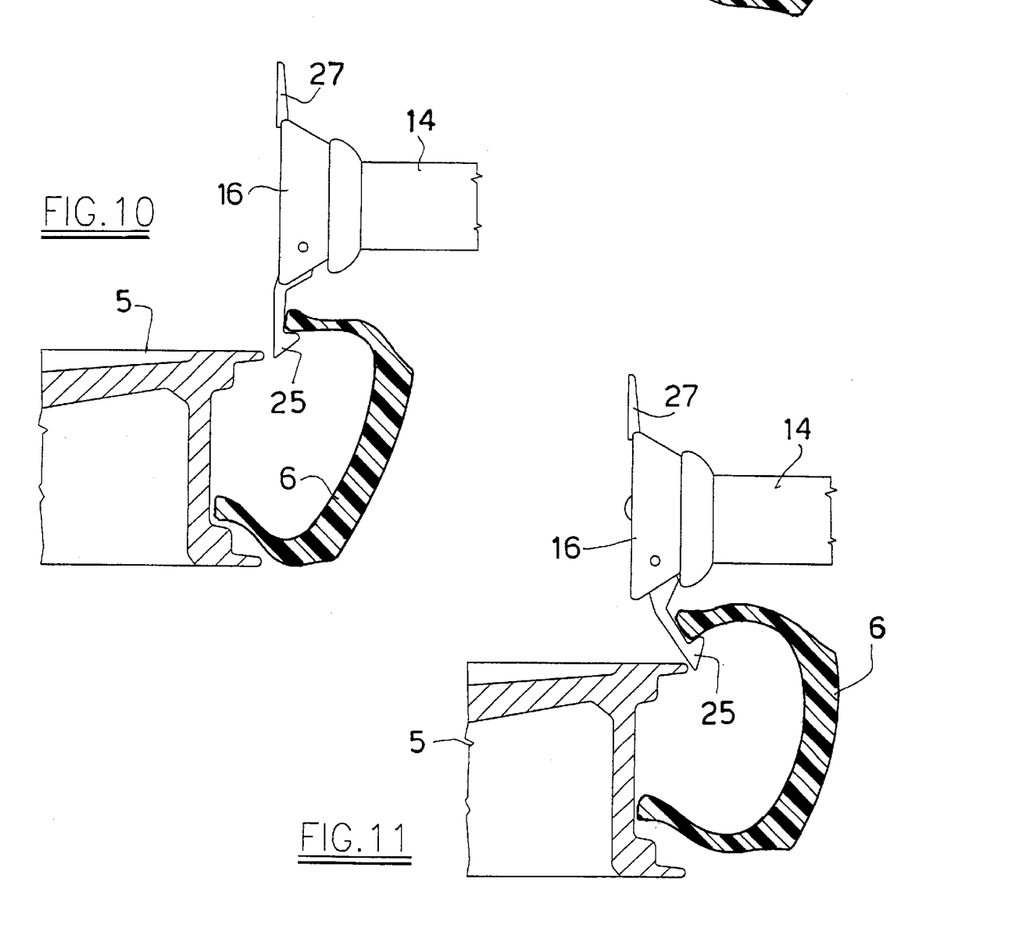

The tool is then returned to the first extraction position, coinciding with the (vertical) rest position, see FIG. 9. The device 9 is raised from this position, as shown in FIG. 10, to extract a portion of the tyre upper bead to above the wheel rim. The wheel rim is simultaneously rotated so that the entire upper bead leaves the wheel rim.

To facilitate the escape of the tyre bead from the wheel rim and decrease the tension to which the bead is subjected, once the tyre upper bead has been gripped in the described manner and a part of it has been extracted from the wheel rim flange, the tool 25 can be repositioned in said second extraction position (FIG. 11). In this manner the tool 25 rotates in the opposite direction to that of the wheel rim through an angle á. Simultaneously, to prevent excessive tyre deformation, the shaft is advanced in the tool direction by an amount equal to the chord subtended by the angle á measured at the tyre bead gripping hook so that the tyre upper bead lies within the wheel rim diameter.

The wheel rim 5 is then rotated so that the entire upper bead of the tyre 6 leaves the wheel rim.

When the tyre upper bead has been extracted, the tool is moved into its seeking position to release the tyre bead from it, after which the tool is returned to its rest position. The processor then withdraws the shaft 14 and lowers the carriage 8 to move the operating head 16 below the tyre. At this point the shaft 14 is made to rise to move the mounting tool 27 to a few millimeters from the lower flange of the wheel rim. The carriage is then raised to insert the tool 27 between the upper flange of the wheel rim and the tyre lower bead, with the sidewall of the tyre resting against the head 16. While rotating the wheel rim the shaft 14 is moved continuously upwards until the tyre has completely left the wheel rim.

The tyre is mounted onto the wheel rim using the mounting tool 27. For this purpose the operator rests the tyre on the wheel rim by inserting a part of the lower edge of the tyre bead into the well of the wheel rim such that the tyre axis is inclined to the vertical axis of the wheel rim. At this point the operator moves the operating head 16 into proximity with the wheel rim flange so that the tool 27 becomes inserted between the upper flange of the wheel rim and the lower edge of the tyre. He then rotates the wheel rim and by lightly pressing on the tyre he causes the entire lower tyre bead to pass below the upper flange of the wheel rim.

Having done this, to insert the upper edge of the tyre into the wheel rim he moves the operating head 16 above the tyre, and then rotates the head 16 through 180° to turn the tool 27 towards the wheel rim. He then lowers the operating head 16 so as to insert the tool 27 between the upper flange of the wheel rim and the upper bead of the tyre. He then rotates the wheel rim and by lightly pressing on the tyre he causes the entire upper tyre bead to pass below the upper flange of the wheel rim.

What is claimed is:

1. An automatic device for mounting and removing a tyre (6) onto and from a wheel rim (5), comprising a lower base (2) having an upper surface from which a rotary shaft (3) projects for supporting a support and a locking means (4) for the wheel rim (5);

means positioned inside the base (2) for moving the shaft (3) in a direction orthogonal to an axis thereof;

a vertical frame (7) supported by the base (2), and a carriage (8) moveable vertically on said frame;

a hollow shaft horizontally supported by said carriage, and aligned with the rotary shaft;

said hollow shaft supporting at a free end thereof an operating head (16) having a tyre demounting tool projecting radially therefrom;

the tyre demounting tool (25) being hinged to the operating head and pivotable about an horizontal axis orthogonal to the axis of the hollow shaft; and operating means for positioning the tyre demounting tool in a first position in which the tool (25) is inclined towards a center of the wheel rim, and in a second position in which the tool (25) is perpendicular to the axis of the hollow shaft.

2. A device as claimed in claim 1, wherein said operating head (16) also has one mounting tool (27) fixed to the operating head and offset by about 180° from said demounting tool (25).

3. A device as claimed in claim 1, wherein the hollow shaft (14) can move axially on said carriage to adjust a position of said operating head (16) relative to the wheel rim (5).

4. A device as claimed in claim 3, wherein said hollow shaft is moveable by a cylinder-piston unit (18).

5. A device as claimed in claim 1, wherein said carriage (8) is moveable by a male-female screw mechanism (10), wherein the female screw is fixed on said carriage (8) and the male screw (100) is rotatably engaged on the frame (7) and is rotated by an electric motor (11).

6. A device as claimed in claim 1, wherein said hollow shaft can rotate about the axis thereof to position where one of either said mounting tool or said demounting tool is alternatively closer to said wheel rim (5).

7. A device as claimed in claim 6, wherein said hollow shaft (14) is rotated by a rack-and-pinion linkage (21, 22).

8. A device as claimed in claim 1, wherein said demounting tool (25) has a hook-shaped portion projecting from the operating head (16) for gripping a bead of the tyre (6).

9. A device as claimed in claim 1, wherein said demounting tool is connected by a connecting rod (171) coaxially positioned in the hollow shaft to a cylinder-piston unit (17) which pivots the demounting tool to a selected inclination.

10. A device as claimed in claim 9, wherein said cylinder-piston unit (17) comprises a cup-shaped first piston (23), within which a disc-shaped second piston (24) fixed to the connecting rod slides; and wherein end-of-travel positions of said first and second piston determine selected positions of said demounting tool.

* * * * *